Figure 1:
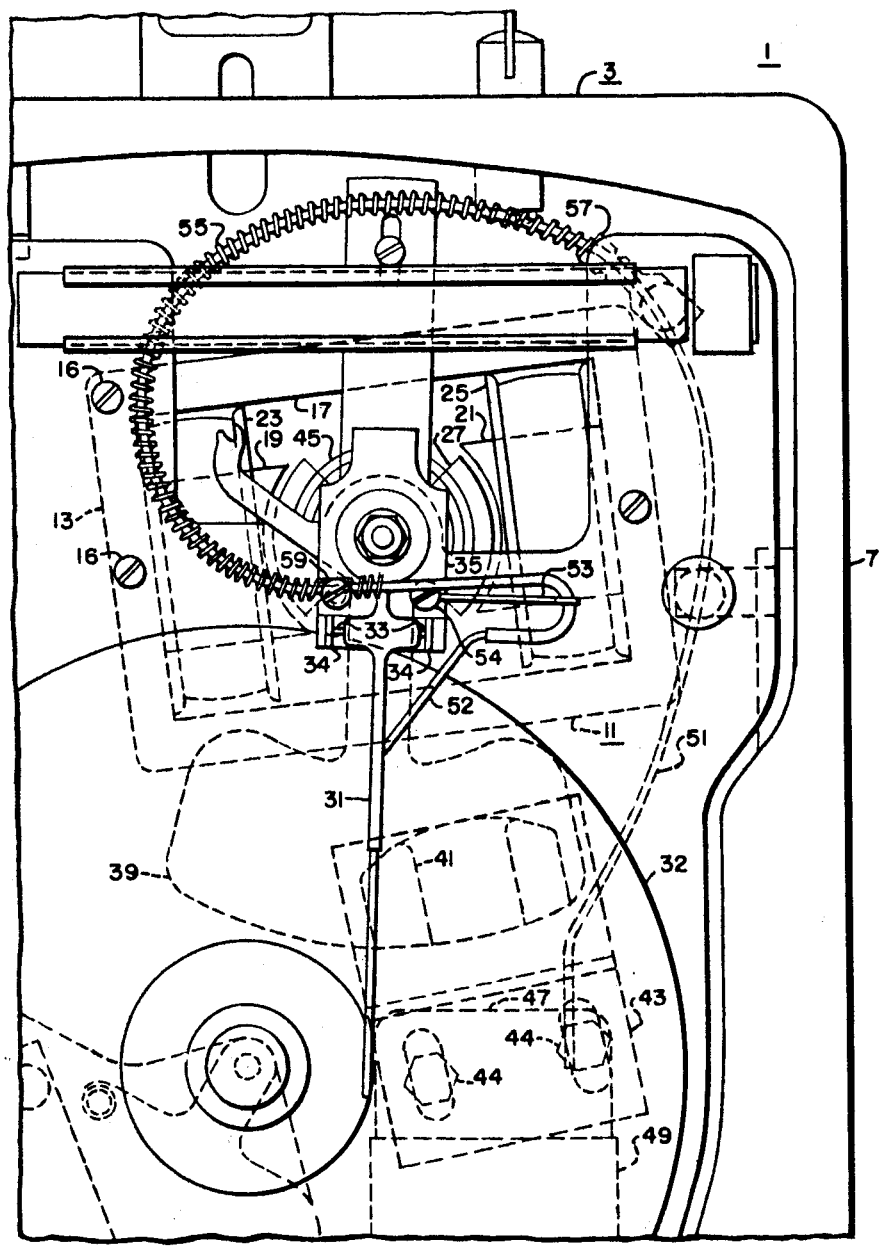

United States Patent Office 2,976,109
Patented Mar. 21, 1961

2,976,109

MOVABLE-PEN RECORDING INSTRUMENTS

Stanley G. Hayter, Bloomfield, N.J., assignor to Westinghouse Electric Corporation, East Pittsburgh, Pa., a corporation of Pennsylvania Filed Nov. 21, 1957, Ser. No. 697,955

11 Claims. (Cl. 346—140)

This invention relates to recording instruments and has particular relation to recording instruments of the direct acting type.

Recording instruments have previously been constructed to record variable electrical quantities such as voltage and current. In such instruments a measuring device including a movable part is ordinarily provided for actuating a suitable indicator, such as a pen, which imposes markings upon a suitable chart for indicating the measured quantity.

When a pen is utilized, it is necessary to provide means for supplying ink to the pen. This has been accomplished in the past by providing an ink container with flexible tubing leading from the container to the pen with the tubing ends connected respectively to the pen and ink container for movement with the pen.

With such arrangement, the problem arises as to the effect upon movement of the pen imposed by unpredictable movements of the flexible tubing. This problem is particularly troublesome in instruments employing a pen which is directly connected to the movable part of the measuring device. Such instruments may be referred to as direct acting instruments. In such direct acting instruments relatively low values of torque are applied to the pen as compared to the torque applied in instruments of the indirect acting type wherein torque amplifying devices, such as linkages, are interposed between the pen and the movable part.

When such flexible tubing is utilized in instruments of the direct acting type, it has been noted that the flexible tubing applies torque to the pen which constitutes an appreciable percentage of the total torque applied to the pen. It has been further observed that the torque applied by the tubing to the pen for a given energization of the measuring device may vary considerably due to inconsistent and non-repetitious movements of the tubing resulting from twisting and bending of the tubing in response to repeated movements of the pen. It has been further noted that such torque variations not only result in undesirable movements of the pen relative to its associated chart but also adversely affect the calibration of the instrument.

According to the present invention, a recording instrument is provided including improved means for supplying ink to a pen assembly from an ink container. In the present invention a recording instrument is provided with flexible tubing supplying ink from an ink container with means guiding the tubing for movement with the pen along a predetermined and repetitious course to substantially eliminate undesirable effects of movements of the tubing upon movements of the pen.

In a preferred embodiment of the invention a direct acting recording instrument is provided including a measuring device having a part rotatable about an axis in response to energization of the device. A pen assembly is directly connected to the moving part for rotation therewith about the axis of the moving part. The tubing includes a portion intermediate its ends which is curved about the axis of the movable part and is effective to supply ink to the pen by capillary action.

According to the present invention guide means preferably in the form of a helical spring surrounds the intermediate curved portion of the tubing with the spring connected respectively to a stationary support and to the movable assembly. This arrangement results in consistent and repetitious movements of the tubing along a predetermined course in response to repeated movements of the pen. The torque applied to the pen by the tubing is, therefore, substantially constant for a given energization of the measuring device and may be substantially compensated in the calibration of the instrument.

The pen assembly is further mounted for pivotal movement about an axis which is transverse to the axis of the rotatable part. The invention provides further that the tubing is connected to the pen along a line which is common to the axis of pivotal movement of the pen.

It is, therefore, an object of the invention to provide a recording instrument including a measuring device for actuating a recording pen with improved means for supplying ink to the pen from an ink container.

It is another object of the invention to provide a recording instrument including a measuring device for actuating a recording pen with flexible tubing supplying ink from an ink container to the pen with means guiding the tubing such that movements of the tubing in response to repeated movements of the pen are consistent and repetitious.

It is still another object of the invention to provide a direct acting recording instrument including a measuring device having a movable part directly connected to a recording pen with flexible tubing supplying ink to the pen from an ink container and resilient means supporting the tubing such that the torque applied to the pen by the tubing is substantially constant for a given energization of the measuring device.

It is a further object of the invention to provide a recording instrument including a measuring device for actuating a recording pen with flexible tubing supplying ink from an ink container to the pen with a helical spring surrounding the tubing to support the tubing for consistent and repetitious movements in response to repeated movements of the pen.

It is a still further object of the invention to provide a recording instrument including a measuring device having a part for actuating a pen about a first axis with flexible tubing connected between the pen and an ink container such that the tubing is connected to the pen along a line which is common to a second axis transverse to the first axis about which the pen is pivotable.

Figure 2:
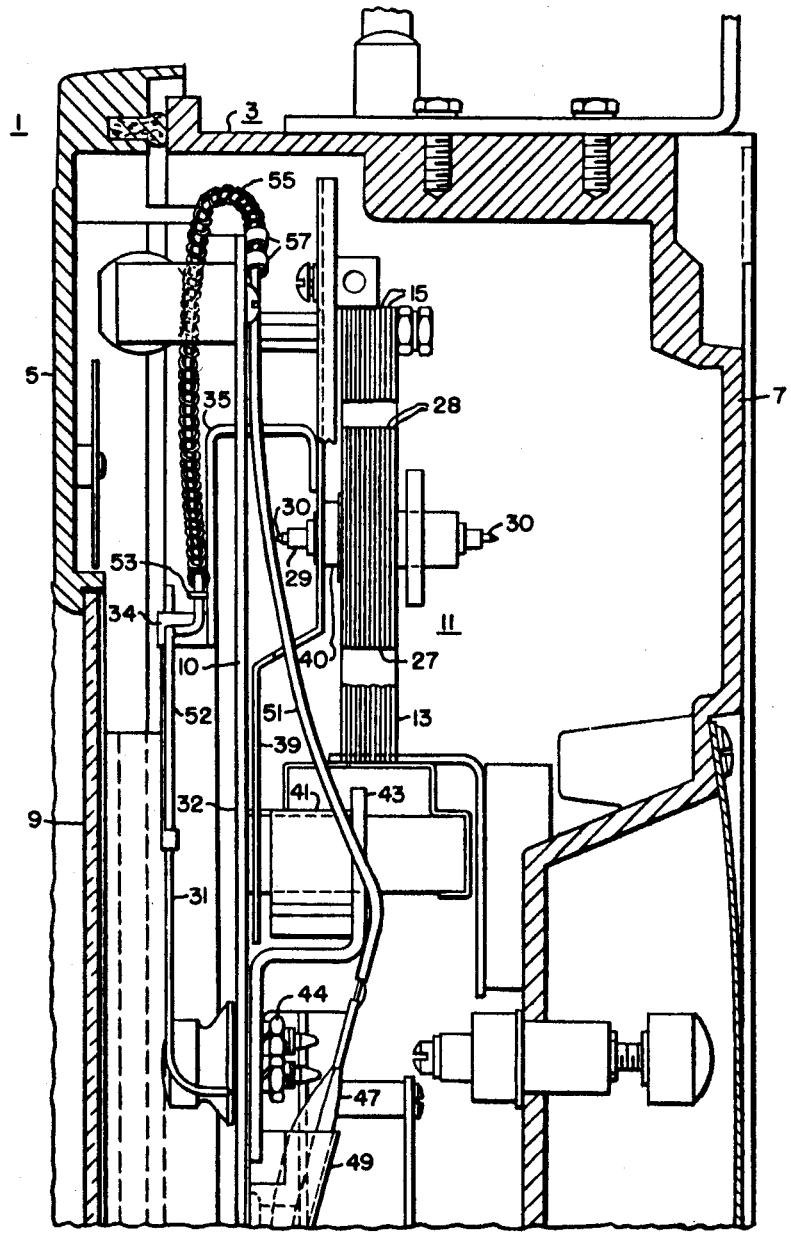

Other objects of the invention will become apparent from the following description taken in conjunction with the accompanying drawings, in which:

Figure 1 is a view in front elevation of a measuring instrument with parts removed and with parts broken away embodying the teachings of the present invention; and Fig. 2 is a view in side elevation of the instrument of Fig. 1 with parts broken away, with parts removed and are contained as best shown in Fig. 2. The casing 3 with parts shown in section.

Referring now to the drawings, there is illustrated a recording instrument for recording a variable electrical quantity such as voltage or current. The instrument is represented generally by the numeral 1 and includes a casing 3 within which operating parts of the instrument includes a front cover section 5 which is removably associated with a rear supporting section 7. The front section 5 includes a transparent window 9 through which parts of the instrument supported by a plate 10 within the section 7 may be observed.

The instrument includes a measuring device 11 which may be of any suitable construction. In the embodiment illustrated the device 11 includes a magnetic structure 13 preferably formed of a plurality of magnetic laminations 15, each having the configuration illustrated in Fig. 1. The laminations 15 may be constructed of any suitable magnetic material, such as silicon steel, and are fastened together in any suitable manner as by bolts 16.

The structure 13 includes a rim portion 17 having an inner periphery from which extend a pair of spaced opposed poles 19 and 21. A pair of windings 23 and 25 surround respectively the poles 19 and 21.

The device 11 is shown in the form of a moving iron instrument having a movable part such as a rotatable armature 27. This armature may be constructed in any suitable manner. Conveniently, the armature may be formed of a plurality of magnetic laminations 28 of soft iron or steel which are fastened together in any suitable manner. The armature may be mounted in the space between the poles 19 and 21 by a shaft 29 for rotation about the shaft axis relative to the poles. For this purpose the shaft 29 may have secured thereto suitable bearing pivots 30 adapted to be mounted by suitable bearing screws (not shown).

The windings 23 and 25 are adapted to be connected to a circuit (not shown) for energization in accordance with an electrical quantity to be measured. The windings are so connected that they tend to establish magnetic fluxes which pass between the poles 19 and 21 in the same direction.

For depicting movement of the armature 27 a suitable indicating member, such as a pointer or pen, may be associated therewith. In the embodiment illustrated, a pen 31 is positioned for movement across the face of a suitable chart 32 to impose markings upon the chart. This chart may be constructed of any suitable material and is in the form of a circular disc mounted for rotation about its axis at a uniform rate by suitable means (not shown). The chart 32 may be designed to rotate at any desired speed. For example, the chart may rotate at the rate of one revolution per week and may be divided into zones each representing one of the days of the week. Each of the zones may be divided further for indicating the hours of each of the days.

The pen 31 is provided with spaced pins 33 for pivotally engaging suitable spaced ears 34 carried by a pen bracket 35. The pen bracket 35 may be supported in any suitable manner for rotation with the armature 27 about the axis of rotation of the armature 27. The pins 33 and ears 34 permit pivotal movement of the pen about an axis transverse to the axis of rotation of the armature.

In order to damp movements of the pen 31, a damping vane may be carried by the shaft 29 for rotation therewith. This damping vane may be formed of an electro-conductive material, such as copper or aluminum. The vane 39 is conveniently secured to a hub 40 carried by the shaft 29 for movement between the poles of a permanent magnet 41. As is understood in the art, movement of the vane 39 between the poles develops a force opposing such rotation which is dependent upon the rate of movement of the vane. The magnet 41 is conveniently mounted by a bracket 43 secured to the supporting plate 10 by screw and nut assemblies 44.

The pen 31 is biased by means of a spiral spring 45 toward one end of its path of movement. The spring 45 has its inner end secured to a stationary portion of the instrument and has its outer end secured to the movable pen assembly in any suitable manner.

In order to supply a suitable marking medium, such as ink to the pen 31, a suitable ink container which conveniently may be in the form of a sealed compressible sack 47 is provided. The sack 47 may be formed of any suitable material and is conveniently supported in an open ended pocket 49 carried by the supporting plate 10.

The sack 47 is located such that the ink level is slightly beneath the tip of the pen.

In order to feed ink from the sack 47 to the pen 31, there is provided a suitable length of flexible hollow tubing 51 which extends between the sack 47 and the pen 31. The tubing 51 is preferably formed of a suitable plastic material and is arranged with the pen 31 such that ink from the sack 47 flows through the tubing to the pen by capillary action. It is noted that one end of the tubing 51 projects into the sack 47 with the other end of the tubing receiving an extension 52 of the pen 31. A portion of the tubing intermediate the ends is curved substantially about the axis of rotation of the armature 27 as best shown in Fig. 1.

The tubing 51 may be threaded through an opening provided at the free end of a rod 53 which is secured to the bracket 35 by a screw 54. It is observed that the adjacent end of the tubing extends along a line which is common to the axis defined by the pins 33 to engage the extension 52 along such line. This arrangement minimizes the effect of the tubing upon the pressure exerted by the pen 31 upon the chart 32.

When tubing of considerable length and flexibility, such as the tubing 51, is utilized to supply ink to the pen 31, it has been observed that unless the tubing is suitably supported movements of the tubing in response to repeated movements of the pen will be inconsistent and non-repetitious. It has further been noted that such movements of the tubing may produce undesirable movements of the pen and may also adversely affect calibration of the instrument.

In accordance with the present invention, means are provided for guiding the tubing such that movements of the tubing are consistent and repetitious in response to repeated movements of the pen whereby the effect of the tubing upon the pen may be substantially compensated in the calibration of the instrument. In the preferred embodiment of the invention illustrated, such guiding means is in the form of a helical spring 55 which is positioned to surround the tubing 51 in engagement therewith over a substantial length of the tubing. As illustrated in Fig. 1, the spring 55 is arranged to surround the portion of the tubing which is curved substantially about the axis of the armature 27.

As illustrated in the drawings, one end of the spring 55 is secured to the support plate 10 by means of spaced ears 57 which clamp the spring end. The other end of the spring 55 is secured to the pen bracket 35 by means of a screw 59. The arrangement is such that the spring 55 guides the curved portion of the tubing for movement substantially in a plane which is transverse to the axis of rotation of the armature 27.

With this arrangement, movements of the tubing caused by repeated movements of the pen 31 are observed to follow a predetermined course in a consistent and repetitious manner. This results in the application of a substantially constant torque by the tubing to the pen for a given energization of the measuring device. As a consequence movements of the tubing do not adversely affect the calibration of the instrument.

Although the invention has been described with reference to certain specific embodiments thereof, numerous modifications are possible, and it is desired to cover all modifications falling within the spirit and scope of the invention.

I claim as my invention:

1. In a recording instrument, a support, a pen assembly mounted for rotation in accordance with a condition to be recorded relative to a recording surface, an ink container spaced from said pen assembly, a hollow tubing for supplying ink from said container to said pen assembly, said tubing being connected between said container and pen assembly for movement in response to movements of said pen assembly, at least an intermediate portion of said tubing being flexible to the extent that it tends to deviate from a desired course of movement during movements of said pen assembly to adversely affect movement of said pen assembly, and flexible supporting means having a first portion carried by said support and having a second portion carried by said pen assembly, said first and second portions being connected by a third portion, at least a portion of said third portion engaging at least a part of said intermediate portion of said tubing to guide said tubing so that the tubing moves repetitiously along said desired course in response to repeated movements of said pen assembly.

2. In a recording instrument, a support, a pen assembly mounted for rotation about an axis in accordance with a condition to be recorded relative to a recording surface, an ink container spaced from said pen assembly, a hollow tubing for supplying ink from said container to said pen assembly, said tubing being connected between said container and pen assembly for movement in response to movements of said pen assembly, at least an intermediate portion of said tubing being flexible to the extent that it tends to deviate from a desired course of movement during movements of said pen assembly to adversely affect movement of said pen assembly, and resilient supporting means carried by said support and having a supporting portion movable relative to said support and engageable with said intermediate portion of said tubing to support said tubing, said resilient means supporting portion being arranged to support the tubing portion so that the tubing moves repetitiously along said desired course in a plane which is substantially transverse to said axis in response to repeated movements of said pen assembly.

3. In a recording instrument, a supporting structure, a pen assembly mounted for rotation relative to said structure and relative to a recording surface about an axis in accordance with a condition to be recorded, an ink container spaced from said pen assembly, flexible hollow tubing for supplying ink from said container to said pen assembly, said tubing being connected between said container and said pen assembly with a portion of said tubing intermediate the tubing ends curved substantially about said axis for movement in response to movements of said pen assembly, said tubing being flexible to the extent that it tends to deviate from a desired course of movement during movements of said pen assembly to adversely affect movement of said pen assembly, and a resilient helical spring surrounding said curved tubing portion in engagement therewith to support said tubing, said spring having one end secured to said structure and another end secured to the pen assembly such that the tubing moves repetitiously along said desired course in response to repeated movements of said pen assembly.

4. In a direct acting recording instrument, a measuring device including a rotor rotatable about an axis in accordance with a variable quantity to be measured, a pen assembly directly secured to said rotor for rotation therewith about said axis relative to a recording surface, an ink container spaced from said pen assembly, flexible hollow tubing for supplying ink from said container to said pen assembly, said tubing being connected between said container and said pen assembly and having an intermediate portion flexible in response to movements of said pen assembly, said tubing portion being flexible to the extent that it tends to deviate from a desired course of movement during movements of said pen assembly to adversely affect movements of said pen assembly, and movable means engaging said portion and movable therewith to guide said tubing portion, said movable means being arranged to guide the tubing portion such that the tubing portion moves repetitiously along said desired course in response to repeated movements of said pen assembly whereby the torque applied to the pen assembly by said tubing is substantially constant for a given energization of said measuring device.

5. In a direct acting recording instrument, a supporting structure, a measuring device carried by said supporting structure, said device including a rotor rotatable relative to said structure about an axis in accordance with a variable quantity to be measured, a pen assembly directly secured to said rotor for rotation therewith about said axis relative to a recording surface, an ink container spaced from said pen assembly, flexible hollow tubing for supplying ink from said container to said pen assembly, said tubing being connected between said container and said pen assembly with a portion of said tubing intermediate the tubing ends curved substantially about said axis for movement in response to movements of said pen assembly, said tubing being flexible to the extent that it tends to deviate from a desired course of movement during movements of said pen assembly to adversely affect movements of said pen assembly, and a resilient helical spring surrounding said curved tubing end portion in engagement therewith to support said tubing, said spring having its one end secured to said structure and its other end secured to the pen assembly such that the tubing moves repetitiously along said desired course in response to repeated movements of said pen assembly, the torque applied to said pen assembly by said tubing thereby being substantially constant for a given energization of said measuring device.

6. In a recording instrument, a pen assembly mounted for rotation in accordance with a condition to be recorded relative to a recording surface, an ink container spaced from said pen assembly, said container comprising a compressible sealed sack, flexible plastic capillary tubing for supplying ink from said container to said pen assembly by capillary action, said tubing being connected between said container and pen assembly for movement in response to movements of said pen assembly, said tubing being flexible to the extent that it tends to deviate from a desired course of movement during movements of said pen assembly to adversely affect movements of said pen assembly, and movable supporting means engaging a substantial portion of the length of said tubing to guide said tubing, said movable means being arranged to move with and to guide the tubing so that the tubing moves repetitiously in a plane substantially transverse to said axis along said desired course in response to repeated movements of said pen assembly.

7. In a recording instrument, a casing, a pen assembly mounted on said casing for rotation about a first axis in accordance with a condition to be recorded relative to a recording surface, said pen assembly being mounted further for pivotal movement about a second axis transverse to said first axis, an ink container spaced from said pen assembly, flexible hollow tubing for supplying ink from said container to said pen assembly, said tubing being connected between said container and pen assembly for movement in response to movements of said pen assembly, means securing one end portion of said tubing to said pen assembly with the axis of said one portion substantially congruent with said second axis, at least an intermediate portion of said tubing intermediate said one end portion and the other end portion thereof being flexible to the extent that said intermediate portion tends to deviate from a desired course of movement during movements of said pen assembly to adversely affect movement of said pen assembly, and means supported by said casing and having a movable supporting portion supporting said intermediate portion of said tubing to guide said intermediate portion of said tubing so that said intermediate portion moves repetitiously along said desired course in response to repeated movements of said pen assembly.

8. In a recording instrument, a pen assembly mounted for rotation relative to a recording surface about a first axis in accordance with a condition to be recorded, said pen assembly being mounted further for pivotal movement about a second axis transverse to said first axis, an ink container spaced from said pen assembly, and flexible hollow tubing for supplying ink from said container to said pen assembly, said tubing being connected between said container and said pen assembly with a portion of said tubing intermediate the tubing ends curved substantially about said first axis for movement in response to movements of said pen assembly, means holding the axis of the end portion of said tubing which is adjacent said pen assembly with its axis substantially congruent to said second axis.

9. In a recording instrument, a pen assembly mounted for rotation relative to a recording surface about a first axis in accordance with a condition to be recorded, said pen assembly being mounted further for pivotal movement about a second axis transverse to said first axis, an ink container spaced from said pen assembly, and flexible hollow tubing for supplying ink from said container to said pen assembly, said tubing being connected between said container and said pen assembly, the axis of an end portion of said tubing adjacent said pen assembly lying substantially along said second axis.

10. In a recording instrument, a support, a pen element, means mounting the pen element for rotation relative to the support about an axis, an ink container mounted on said support, ink-feed means for feeding ink from the container to the pen, said ink-feed means comprising an elongated tube extending from the container to the pen element, said tube having flexibility in a substantial length thereof adjacent the pen element which produces non-repetitious movements of said length in response to repeated movements of the pen element relative to the support, and a guide element extending between the pen element and a point on said support and having a movable portion, said guide element movable portion being self-supporting for repetitious movements in response to repeated movements of the pen element relative to the support, said guide element movable portion supporting said length substantially continuously.

11. In a recording instrument, a support, a pen element, means mounting the pen element for rotation relative to the support about an axis, an ink container mounted on said support, ink-feed means for feeding ink from the container to the pen, said ink-feed means comprising an elongated tube extending from the container to the pen element, said tube having flexibility in a substantial length thereof adjacent the pen element which produces non-repetitious movements of said length in response to repeated movements of the pen element relative to the support, and a guide element extending between the pen element and a point on said support and having an elongated movable portion, said guide element movable portion being self-supporting for repetitious movements in response to repeated movements of the pen element relative to the support, said guide element movable portion extending along and supporting said length substantially continuously.

References Cited in the file of this patent

UNITED STATES PATENTS

| | | |
|---|---|---|
| 1,258,317 | Copley | Mar. 5, 1918 |
| 2,176,777 | Tate | Oct. 17, 1939 |
| 2,450,714 | Campbell | Oct. 5, 1948 |
| 2,466,691 | Daniels | Apr. 12, 1949 |
| 2,626,201 | Young et al. | Jan. 20, 1953 |
| 2,647,713 | Wershing | Aug. 4, 1953 |
| 2,820,689 | Holloway | Jan. 21, 1958 |